July 19, 1949.    R. W. KREBS    2,476,420
METHOD OF RECOVERY OF PRECIOUS METALS
Filed Dec. 13, 1946                                     2 Sheets-Sheet 1
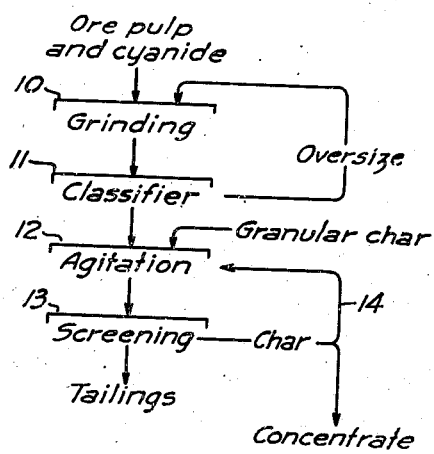
FIG_1
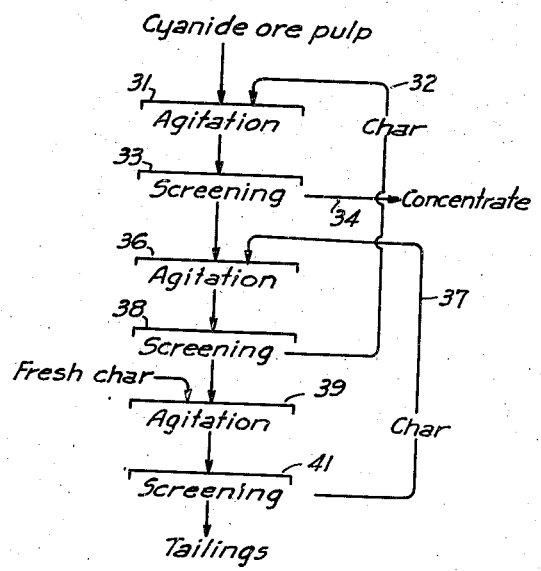
FIG_2
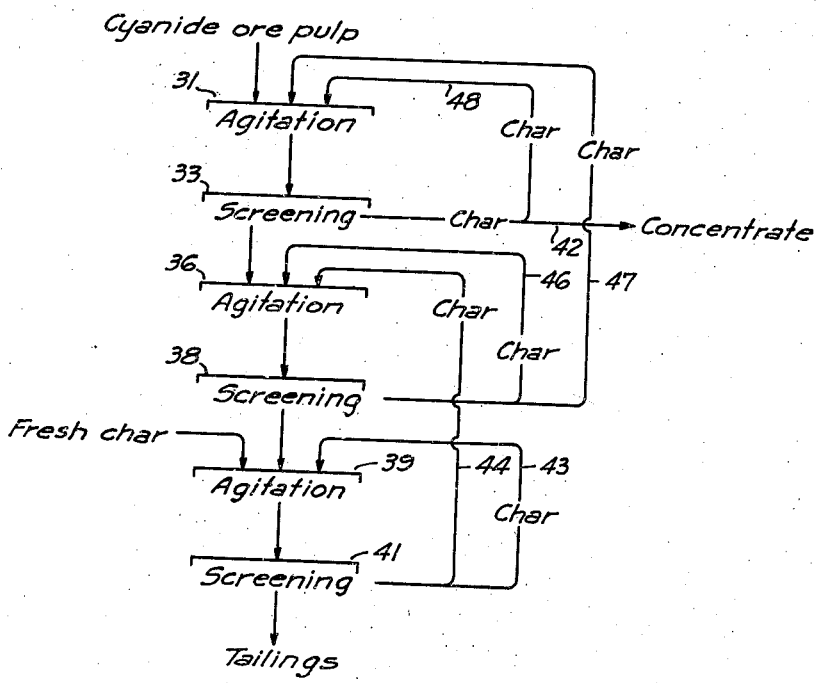
FIG_3
INVENTOR.
Richard W. Krebs
BY
ATTORNEY July 19, 1949.  R. W. KREBS  2,476,420
METHOD OF RECOVERY OF PRECIOUS METALS
Filed Dec. 13, 1946  2 Sheets-Sheet 2
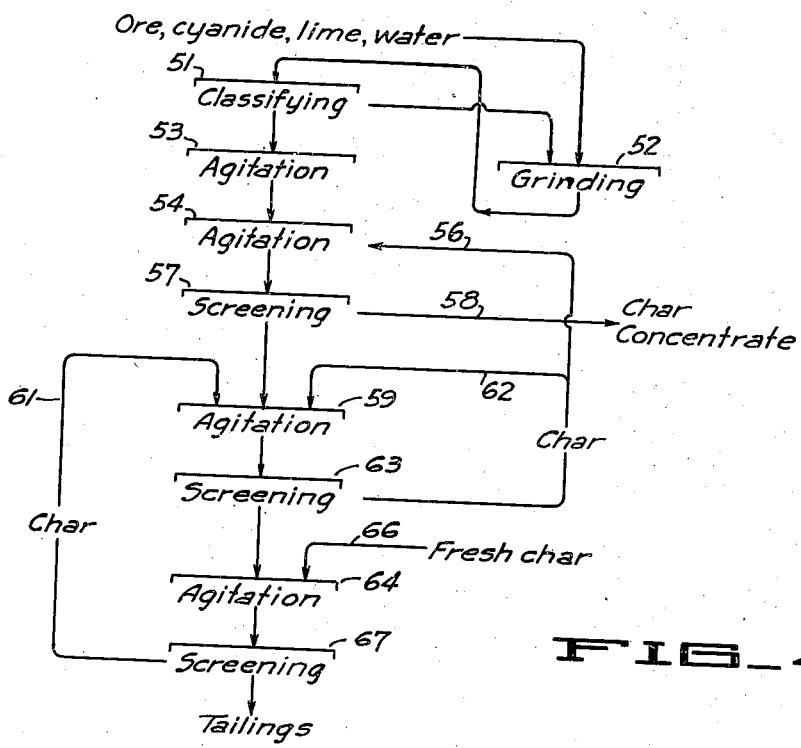
FIG_4_
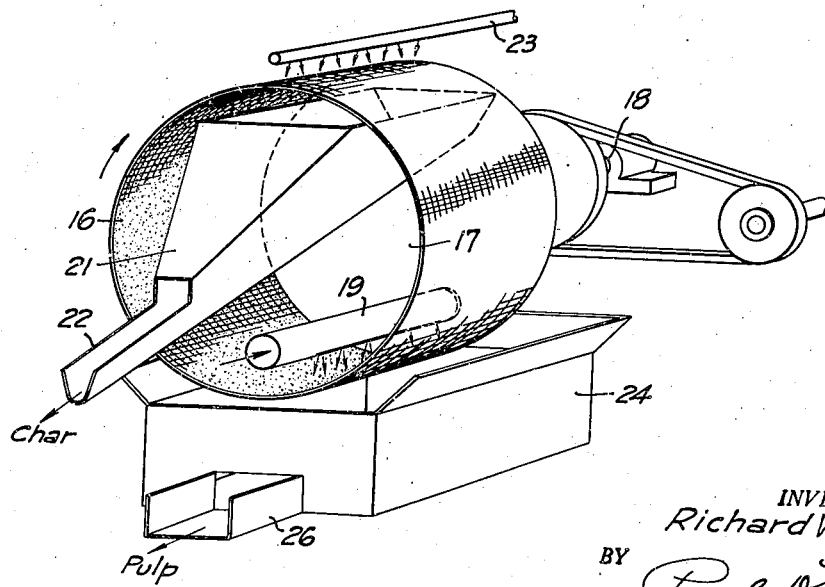
FIG_5_
INVENTOR.
Richard W. Krebs
BY
ATTORNEY Patented July 19, 1949

2,476,420

UNITED STATES PATENT OFFICE 2,476,420

METHOD OF RECOVERY OF PRECIOUS METALS

Richard William Krebs, Grass Valley, Calif.

Application December 13, 1946, Serial No. 716,127

5 Claims. (Cl. 75—106)

This invention relates generally to methods or processes for recovering precious metal values from various ore solids.

In the past it has been common practice to dissolve precious metal values (i. e., gold and/or silver) from ores by the use of cyanide solution, followed by separation of the solution from the ore solids, and precipitation of the precious metals from the clarified solution as by contact of the same with zinc dust or like precipitant. Such methods are satisfactory where the ore solids after grinding are of such a character that they can be economically separated from the cyanide solution. In many instances however the ore solids present are of such a character that separation from the cyanide solution is relatively difficult, and may render the process uneconomical. Solids of this character which are difficult to separate are commonly referred to as "slime solids," and are of such small particle size as to make separation from the solution difficult or impractical by ordinary methods of settlement or filtration. When it is attempted to make a separation which removes the solution from such slime solids, considerable loss in dissolved precious metal values occurs, which reduces the overall recovery of the process.

It has been proposed to remove precious metals from cyanide pulps containing slime solids by introducing into the pulp a finely divided char capable of adsorbing the gold and/or silver. Thereafter the finely divided char is removed from the pulp by a flotation operation. Such a process is disclosed for example in United States Bureau of Mines, Technical Paper 378, published 1926, by Gross and Scott.

Attempts to utilize such a process in commercial operations has revealed a number of practical difficulties which are of sufficient detriment to render the process commercially impractical. To mention certain of these difficulties, the grade of char concentrates produced by flotation is reduced by extraneous material, and by such minerals and solids of the ore slimes that float readily and consequently report with the char in the flotation concentrate. Examples of materials which may float with the char are sulphide minerals of iron and other metals, and carbonaceous gangue material. A poor grade of char concentrate intermixed with other floated solids increases the cost of converting such a concentrate into bullion. Another difficulty met with in attempting to utilize flotation for removal of the gold-laden char is that of obtaining total recovery of the finer particles of char by means of flotation. Adhering coatings of ore slimes frequently blank off the finer char particles and prevent flotation agents from acting on the char so coated, thus interfering with the flotation operation and preventing total recovery of the finer char particles. This difficulty of effecting 100% recovery of the finely divided desirable components from ore slimes is well known to those versed in the art of flotation. Some of the finer particles of gold-laden char are thus not recovered and are discharged to waste with the ore slimes, thereby reducing the overall gold recovery obtained. A further difficulty which impairs the practical success of the process involving the use of flotation for removing the char is that flotation oils and collecting agents used to effect the flotation operation are adsorbed by the char, with the result that the char loses much of its ability to further adsorb precious metals. Consequently the char removed by flotation cannot be effectively reused in the process for the purpose of securing higher grade concentrate. The low grade character of the char concentrate obtained by flotation makes for excessive consumption of char thus substantially increasing the cost of overall recovery per ounce of gold.

It is an object of the present invention to provide a method or process applicable to ore solids or pulps containing slime solids, and which will overcome the difficulties of prior flotation processes of the type described above.

It is a further object of the invention to provide a method of the above character which makes possible the production of a relatively high grade char concentrate. For example by application of the present invention I have obtained char concentrates which when burned, give an ash containing of the order of 1500 to 4000 ounces or more of gold per ton of ash, whereas with prior flotation processes utilizing finely divided char the literature refers to obtaining concentrates of the order of from 10.3 to 207.8 ounces of gold per ton of ash. I have also obtained chars loaded with both gold and silver. For example in one instance a char was obtained which when burned contained 4070 ounces of gold and 1300 ounces of silver per ton of ash. In another instance the char when burned contained 2880 ounces of gold and 1600 ounces of silver per ton of ash.

A further object of the invention is to provide a method for the treatment of ores or pulps containing slime solids which makes use of charcoal as an adsorbent of the dissolved gold and/or silver, but which eliminates entirely the use of flotation and flotation agents in removing the char concentrate from the pulp.

Further objects of the invention will appear from the following description in which certain embodiments of the invention have been described in detail with reference to the flow sheets of the attached drawing.

Referring to the drawing:

Figure 1 is a simplified flow sheet illustrating one procedure for carrying out the present invention.

Figure 2 is a flow sheet illustrating another embodiment of the invention.

Figure 3 is a flow sheet illustrating a third embodiment of the invention.

Figure 4 is a flow sheet illustrating a fourth embodiment of the invention.

Figure 5 is a diagrammatic perspective view showing suitable screening apparatus for removing the char.

As previously stated the prior art discloses the use of finely divided char in cyanide pulps for the purpose of adsorbing dissolved gold and/or silver, followed by a flotation operation to remove the char concentrate. It is taught by the prior art that an increase in the fineness of the char is accompanied by an increase in the efficiency of adsorption. A characteristic of the present invention, which is contrary to the teaching of the prior art, is that use is made of a granular char having a particle size substantially larger than the largest size ore solids present in the pulp. The char after adsorption of dissolved values is removed from the pulp by a simple screening operation, whereby the resulting concentrate is relatively free of ore solid and is uncontaminated by flotation oils or other reagents hence the adsorbing activity of the char is not impaired and the char may therefore be reused in further adsorption operations. This permits use of less new char to carry out the process, and also permits a higher grade char concentrate to be produced.

The granular char used should be one having relatively high adsorptive efficiency with respect to dissolved gold and/or silver, and it should be non-friable, that is, it should have sufficient hardness to prevent any material amount of crumbling or abrasion while being subjected to agitation in the pulp, or in the screening or attendant handling operations.

Referring to the simplified flow sheet of Figure 1, a cyanide ore pulp is prepared having its ore solids ground to proper size to permit dissolution of the precious metal values. Thus an ore pulp and cyanide are shown being supplied to a grinding operation 10 (such as a ball mill) which may be in closed circuit with a conventional classifier 11. The cyanide solution of the pulp may conform to standard conventional practice and may consist for example of dissolved alkaline cyanides such as sodium cyanide, together with lime to provide the desired alkalinity. During grinding the more friable ore solids are reduced to relatively fine particle size forming suspended slime solids of the type previously described. The extent and fineness of grinding will depend upon the ore solids being treated, but in a typical instance the solids will all be less than 65 mesh. During preparation of the pulp a substantial part or all of the gold values are dissolved by the cyanide solution, and if desired a sufficient period of time retention with agitation can be provided in order to insure complete dissolution before further treatment. Assuming that the method is being carried out by batch treatment, a quantity of granular char is added to the agitating operation 12 as indicated, whereby the granular particles of the char are intermingled with the pulp to effect adsorption of dissolved gold and/or silver. The amount of char employed will depend somewhat upon its adsorptivity, the concentration of the gold and/or silver in the solution, and the time period of retention being permitted. Sufficient char should be used for reasonably effective and efficient adsorption of the desired values. An excessive amount of char results in lowering the grade of the removed concentrate. An insufficient amount of the char for the quantity of pulp being handled and the time period of retention causes an increase in the amount of dissolved metal contained in the tailings.

After introduction of the char agitation is continued for a period of time reasonably sufficient to adsorb the precious metal values to the extent desired. Thereafter the pulp is subjected to the screening operation 13 which serves to screen out the char, with the ore solids and solution passing through the screen as tailings. As indicated it is possible to return a part 14 of the removed char back to the agitating step 12. This serves to further load the char with adsorbed values, thus increasing the grade of the concentrate.

A desirable type of apparatus for carrying out the screening operation is illustrated in Figure 5. It consists of a cylindrical shaped screen 16 of proper mesh, which is carried by an end plate 17. This plate in turn is mounted upon the rotatable shaft 18. A conduit or launder 19 serves to discharge the pulp upon the lower portion of the screen. Within the screen 16 and underlying the upper portion of the same there is a collecting hopper 21, which connects with the discharge launder 22. Above the screen there is a pipe 23 serving to apply wash water or jets of air to the screen. In addition to such means or alternative thereto a mechanical tapper or vibrator can be applied in order to insure discharge of the screened out char into the collecting hopper 21. A collecting hopper or box 24 underlies the screen and connects with the pulp discharge launder 26.

The apparatus illustrated in Figure 5 operates as follows: The screen 16 is rotated at a relatively slow rate and the pulp to be treated supplied to the launder 19 and delivered within the screen on the lower portion of the same. The cyanide ore pulp passes through the screen to the collecting box 24, and is removed by launder 26. The granular char is retained or separated upon the screen and is carried upwardly as the screen rotates until finally being discharged into the collecting hopper 21. Screening equipment of this type is desirable in that it operates effectively upon the relatively light weight char, and in addition it causes a minimum amount of attrition.

Previous reference has been to the fact that the char employed should have sufficient hardness to prevent any substantial degree of crumbling during handling of the same, including agitation with the pulp and screening. Such crumbling forms objectionable finely divided char which would be lost with the tailings in the screening operation. In addition the char must be such that its particle size is greater than the largest particles of the ore solids in the pulp, to enable the same to be readily separated by screening from the pulp, and its adsorptivity in granular form should be such that it adsorbs precious metal values from the pulp to a reasonable degree of efficiency. Chars having the above properties are available in the United States and are known generally as granular activated char or carbon.

By way of example one type of granular char which has been used with good results is known in the trade as Atlas 20—30 char, and which meets the requirements of United States Chemical Warfare Service Specification 97—52—121. This is an activated char (charcoal or carbon) made from apricot and/or peach pits. It has a hardness of about 70, when tested according to the hardness test specified by Chemical Warfare Service. Briefly this test makes use of a standard testing pan measuring 8 inches in diameter and 1½ inches deep in which is placed fifteen one-half inch, and fifteen three-eighth inch, smooth steel balls, together with 50 grams of 12 to 16 sieve size char. The pan is covered and then placed upon a vibrating machine (Serial No. 3019 manufactured by W. S. Tyler Company, and known by the tradename of "Ro-Tap Testing Sieve Shaker") directly connected to a motor having a speed of 1725 R. P. M. The pan is permitted to shake for 30 minutes with the tapper in operation. At the end of this time all of the charcoal is placed on a number 20 standard sieve, and after this sieve is assembled with a cover and receiving pan, it is placed again upon the vibrating machine for 3 minutes with the tapper in operation. The charcoal remaining upon the 20 sieve is weighed, and this weight multiplied by two to give the hardness number.

The hardness of Atlas 20—30 char is ample for use in the present process in that crumbling of the granules is negligible and does not occasion any appreciable loss.

Atlas 20—30 char has an apparent density of about 0.41 gram per milliliter, which corresponds to about 25.6 lbs. per cubic foot. The relatively low apparent density is due in part to the porosity of the material. Upon introduction of the char into the pulp the solution readily penetrates the pores of the char whereby the particles of char sink and intermingle with the pulp, instead of floating upon the surface.

The adsorptive activity of Atlas 20—30 char has been determined by reference to its ability to adsorb gold from cyanide solution. Thus when 1 gram of this char is introduced into 2 liters of cyanide solution containing .18 gram sodium cyanide and .02 gram lime, and in which 1.910 milligrams gold has been dissolved, and the char permitted to remain in contact with the solution with gentle agitation for a period of 4 hours, 90–93% of the gold will be adsorbed by the char.

As will be understood by those familiar with the characteristics of adsorptive materials, during the initial period of contact with the solution the adsorption of the gold occurs at a relatively rapid rate, with a continual decrease in the rate of adsorption towards the end of the retention period. A more highly adsorptive char requires a lesser period of time retention for a given amount of adsorption. The rate of adsorption is also in part a function of the concentration of dissolved gold in the solution, in that for a given amount and type of char, gold will be adsorbed from a richer solution at a more rapid rate than from a solution containing a lesser amount of dissolved gold. In addition the char adsorbs a greater amount of gold (for a given weight of char) for greater concentrations of gold in the solution. It will be evident that these factors must be kept in consideration in carrying out the present invention, whereby the various operations of the process will be adjusted in such a manner as to give the desired degree of adsorption without undue consumption of the char, and without undue losses in the tailings.

The procedure outlined with reference to Figure 1 can be modified in certain respects. For example if desired a part of the tailings from the screening operation 13 can be returned back to the agitating operation 12. Instead of operating in batches it is possible to operate the process continuously by the use of proper agitating and screening equipment capable of being continuously supplied with pulp. Likewise it is apparent that a number of units of equipment may be used for each of the various operations, including agitation 12 and screening 13.

While the method as illustrated in Figure 1 is workable, it is desirable to carry out the method in such a fashion as to make possible a higher grade of concentrate, thus facilitating subsequent conversion of the concentrate to bullion and reducing the consumption of char. Thus as illustrated in Figure 2 a cyanide ore pulp in which the precious metal values have been either completely or partially dissolved is subjected to agitation at 31 together with a char introduced as indicated by line 32. After a period of retention and agitation the material is delivered to the screening operation 33, where the char is removed as indicated by line 34. The pulp from the screening operation 33 is delivered to a second stage of agitation and retention 36 where it is again intermixed with char introduced by line 37. Following operation 36 the material is subjected to screening at 38 whereby char is removed which is utilized for introduction into the first agitation operation 31 as indicated. The pulp from screening operation 38 is subjected to another agitation and retention operation 39 into which fresh char is introduced as indicated. This material is then subjected to final screening 41 and the char removed used for introduction into the agitating operation 36. It will be evident that according to the procedure of Figure 2 the char is progressed countercurrent to the flow of pulp, and that the last stage of adsorption is by contact with fresh char, whereas the incoming pulp is contacted with char which has been used in the process and which immediately thereafter is withdrawn as concentrate. Since the cyanide solution is richest in dissolved gold at the time it enters the process, the char contacting the pulp at the head of the process is given a final loading to afford a high quality concentrate. At the same time the fresh char entering the last agitation stage of the process serves to scavenge dissolved gold from the cyanide solution, thereby reducing to a minimum the amount of gold and/or silver left in the tailings.

Attention is directed to the fact that re-use of the char to effectively load the same with adsorbed metal is made possible in the present process because the char after its initial contact with the pulp and removal by screening, retains its ability to adsorb further gold and/or silver, since its adsorptivity is not impaired by contaminants such as flotation agents used in prior processes.

The procedure shown in connection with Figure 2 can likewise be modified in various respects. Here again if desired some of the pulp from the various screening operations can be returned to the process. Likewise the operations can be either according to batch method, or continuous.

Figure 3 illustrates a more elaborate flow sheet. Operations 31, 33, 36, 38, 39 and 41 are substantially as illustrated in Figure 2. Fresh char is introduced into the agitating operation 39, and loaded char concentrate 42 is removed. Line 43 represents the return of a part of the char from the screening operation 41 to the preceding agitating operation 39, and line 44 represents the remainder of the char from screening operation 41 being re-introduced back into the agitation operation 36. Line 46 represents return of some char from screening operation 38 to the agitation operation 36, and line 47 represents use of the remaining char from operation 38 for introduction into the first agitation operation 31. Line 48 represents re-circulation of a part of the char from screening operation 33 to the agitation operation 31. By adjusting the amount of char handled in the returns 43, 46 and 48, the proportion of char present to the quantity of pulp being handled can be adjusted as desired for the various agitating operations 31, 36 and 39. Here again there is counterflow movement of the char with a final loading of the char to provide a high grade concentrate, and with a final scavenging of the pulp to provide tailings of relatively low and dissolved values.

The embodiment of the invention outlined in Figure 4 employs some of the features of both Figures 2 and 3. Ore, cyanide, lime and water are shown being supplied to the grinding operation 52 which is in closed circuit with the classifying operation 51. The ground cyanide pulp is then delivered to the agitation and retension operation 53 where a sufficient time retention can be provided to insure substantially complete dissolution of the gold and/or silver. The pulp is then delivered to the agitation and retention operation 54 where it is intermingled with char introduced as indicated by line 56. It will be evident that operations 53 and 54 can be combined if desired, particularly where batch methods are being used. In other words a batch of material can be subjected to agitation for a period of time retention for complete dissolution, as indicated for operation 53, and then the char introduced into the same piece of equipment.

After operation 54 the material is subjected to screening 57 for removal of the char concentrate 58. The pulp passing through the screen is subjected to further agitation and retention 59, where it is intermingled with char introduced as indicated by lines 61, 62. Thereafter the pulp is subjected to screening 63 and the char thus removed re-introduced into operations 54 and 59 as indicated by lines 56 and 62. The screened pulp from 63 is supplied to the last stage of agitation and retention 64 and into which the fresh char 66 is introduced. The final screening 67 removes char which is used for introduction into operation 59 by way of line 61.

By utilizing the procedure as outlined in Figure 4 the process is in effect carried out in four different phases. The first phase includes the operations 51, 52 and 53 and serves to reduce the pulp solids to proper fineness for release of the gold values, and to build up the dissolved gold content of the solution whereby char can be contacted with the enriched solution in the second phase of the process to provide a high grade concentrate.

In the second phase of the process represented by operations 54 and 57, and which can be termed a char loading phase, a part of the dissolved gold content of the pulp is adsorbed by the char to provide a high grade concentrate, which is then removed from the process by screening.

In the third phase of the process represented by operations 59 and 63, and which can be termed the main adsorption phase, the char and cyanide solution of the pulp are brought to substantial equilibrium. It is after such equilibrium that the char is removed by screening and advanced to operation 54 to increase its gold load to a maximum. In the event the gold and/or silver content of the ore is not completely dissolved in prior operations, dissolution is completed in the agitation and retention operation 59. Re-circulation of char indicated by line 62 serves to greatly increase the amount of char present in proportion to the amount of pulp being treated, and the amount of this recirculation together with the retention time for operation 59 are adjusted to effect the desired condition of equilibrium. Such re-circulation of char can also be applied to stage 54, with or without re-circulation in stage 59, or can be applied in all stages as in Figure 3.

The last or fourth phase of the process is carried out by operations 64 and 67, and can be termed the stripping or scavenging phase. It serves to strip or scavenge residual gold in the solution which is not adsorbed in operation 59. The fresh char contacted with the pulp in operation 67 is highly efficient for the purpose of adsorbing remaining dissolved values, and the retention time in operation 64 is adjusted whereby the gold and/or silver value remaining in the tailings is reduced to a minimum.

An actual example of the present process is as follows: Material treated was ore slimes from a large North American gold mine containing .120 ounce gold per ton, with some pyrrhotite. Screen analysis of the slime product, after grinding and classifying the ore was as follows:

|  | Per cent |
|---|---|
| All — 48 |  |
| + 65 | 1.0 |
| +100 | 0.5 |
| +200 | 4.5 |
| —200 | 94.0 |
|  | 100.0 |

The presence of pyrrhotite in this particular ore made necessary the use of an extra step involving aeration of the pulp to oxidize the pyrrhotite and thereby reduce the cyanide consumption in the subsequent treatment of the ore slime.

The slime was treated by a laboratory continuous pilot-plant type operation following the procedure indicated by the flow sheet in Figure 4, with the exception of the preliminary aeration step above referred to.

The ore slime at a dilution of 1.5 tons of water per ton solids and with 6.8 pounds lime per ton of ore added, was aerated by means of low pressure air for 5 hours in a Pachuca-type agitator tank, then sodium cyanide added in an amount equal to 0.9 pound per ton solution and the pulp cyanided in a mechanical-type agitator (53 of Figure 4) until dissolution of gold was substantially complete. The dissolution step required a detention period of 42 hours.

Following the dissolution step, the pulp passed through successive steps corresponding to the operations (54, 57, 59, 63, 64, and 67) of Figure 4 to effect adsorption of the dissolved values on char. Atlas 20—30 char, in amount equal to 1.5 pounds per ton ore slimes was added (66) to the last agitator step (64) where a 24 hour contact was had, then screened from this pulp through a 48 mesh screen (67) and advanced (61) to next preceding agitator (59) where a 24 hour contact was had. In this intermediate agitator additional Atlas 20—30 char in amount equivalent to 6 pounds per ton ore slimes was added at the start of the test run so as to provide a continuous circulating load of 6 pounds char per ton of ore slime, in agitator (59).

The char leaving this intermediate step (59) was screened from the pulp on a 48 mesh screen (63) and split in the ratio of 1.5 parts to 6 parts, the 1.5 parts of char being advanced (56) to the first or loading agitator (54), and the remaining 6 parts of char returned (62) to agitator (59) as a circulating load.

In the first or loading agitator (54) the char contacted the pulp for 24 hours, and was screened (57) out of the pulp leaving this agitator and removed (58) from the system as the finished char concentrate. It will be noted that the rate at which finished char concentrate was withdrawn from the system equalled the rate at which new char was added to the system, that is, at the rate of 1.5 pounds char per ton ore slimes.

This system was operated until equilibrium was established, that is, until assays of all products became substantially uniform over several days of operation. The results averaged as follows:

|  | Relative weights (expressed in short tons) | Assay ounces gold/ton | Contents ounces gold | Percent Recovery |
| --- | --- | --- | --- | --- |
| Feed | 1.00 | 0.120 | 0.120 | |
| Tailings solids | 1.00 | 0.0054 | 0.00540 | |
| Tailings solution | 1.50 | 0.00048 | 0.00072 | |
| Char concentrate | 0.00075 | 151.84 | 0.11388 | 94.9 |

The char concentrate obtained in the above example when burned to ash assays 1598.968 ounces gold per ton ash.

It will be obvious to those skilled in the art that the optimum amount of char and the optimum duration of the contact periods in the several stages may vary with different ores and between the different flow sheets typified by Figures 1 to 4, but that the optimum values of these variables can easily be established for any specific ore.

The advantages of the present process in contrast with prior processes utilizing finely divided char and a flotation operation, will be apparent from the above. Instead of obtaining diluted char concentrate containing both char and extraneous material, as with flotation, the present process produces a clean char concentrate which can be readily washed by water sprays on clean-up screens to produce a char of high grade. The absence of ore slimes, sulphides, and other floatable material greatly increases the ease, and reduces the cost of converting such a concentrate into bullion. Whereas a flotation operation occasions mechanical losses of some of the gold laden char in the flotation operation, the present process making use of screening of the coarse char enables a 100% recovery of the char concentrate. Because the present process is characterized by the total absence of frothing oils and collecting agents essential to the flotation process, the char after its initial contact and separation with the pulp remains adsorptive and can therefore be loaded in one or more subsequent adsorption operations to produce a high grade concentrate.

In general the remarkable characteristics described above makes the process highly economical and practical for the recovery of gold and/or silver values from various ores containing solids of the slime type. Overall recovery is high, the consumption of char is relatively low, and a high quality char concentrate is obtained which can be readily reduced to bullion. The equipment required is relatively simple and economical in power requirements, and no additive chemicals or treating elements are required, as with flotation.

The present process can be applied with advantage to cyanide slime pulps produced as a by-produce from conventional recovery processes, or to ores directly treated to form a cyanide pulp and containing highly friable ore solids of such a character as to make conventional treatment methods impossible, impractical or uneconomical.

This application is a continuation-in-part of my copending application Serial Number 640,365, filed January 10, 1946, which has been abandoned.

I claim:

1. In a process of recovering the major portion of cyanide soluble precious metal values from a cyanide pulp containing precious metal values, the steps of adding a granular non-friable adsorbent char to the pulp to effect adsorption of precious metal values present, all of the particles of the char being of a size substantially greater than the particles of the ore solids of said pulp, and then completely separating the granular char from the pulp by screening.

2. In a process for the substantially complete recovery of cyanide soluble precious metal values from a cyanide ore pulp containing precious metal values, introducing into the pulp a granular non-friable adsorbent char to effect adsorption of precious metal values present from the cyanide solution of the pulp, all of the particles of the char being of a size substantially greater than the particles of the ore solids of said pulp, completely separating the char from the pulp by screening, introducing another portion of said granular char into the pulp so treated to effect further adsorption of the precious metal values, completely separating said other portion of char from the pulp by screening, and utilizing the char last separated to adsorb additional precious metal values by introducing it into a fresh amount of ore pulp and completely separating it therefrom by screening.

3. In a method for the substantially complete recovery of cyanide soluble precious metal values from a cyanide ore pulp, the steps of subjecting the pulp to a plurality of successive adsorption operations with each adsorption operation being followed by a screening operation, each adsorption operation being carried out by introducing granular non-friable adsorptive char into the pulp, whereby the char adsorbs precious metal values from the cyanide solution of the pulp, all of the particles of the char being of a size substantially greater than the size of the particles of the ore solids of said pulp, and with the screening operation following each adsorption operation completely separating the char from the pulp, introducing fresh char into the last one of said adsorption operations to scavenge remaining values from the pulp, returning the screened out char from each screening operation countercurrently through the successive adsorption operations towards the head of the process, and removing from the process the loaded char concentrate separated from the pulp in the screening operation following the first adsorption operation, said loaded char containing the major portion of the precious metal values present in the original pulp.

4. In a process of recovering the major portion of cyanide soluble gold values from a cyanide pulp containing gold values, the step of adding a granular, non-friable adsorbent char to the pulp to effect adsorption of the gold values present, all of the particles of the char being of a size substantially greater than the particles of the ore solids of said pulp, and then completely separating the granular, non-friable char from the pulp by screening.

5. In a process of recovering the major portion of cyanide soluble silver values from a cyanide pulp containing silver values, the step of adding a granular, non-friable adsorbent char to the pulp to effect adsorption of the silver values present, all of the particles of the char being of a size substantially greater than the particles of the ore solids of said pulp, and then completely separating the granular, non-friable char from the pulp by screening.

RICHARD WILLIAM KREBS.

REFERENCES CITED

The following references are of record in the file of this patent:

UNITED STATES PATENTS

| Number | Name | Date |
|---|---|---|
| 1,509,156 | Lawry | Sept. 23, 1924 |
| 2,147,009 | Chapman | Feb. 14, 1939 |

OTHER REFERENCES

The Journal of the Chemical, Metallurgical, and Mining Society of South Africa, vol. 12, July 1911, June 1912, page 102.